United States Patent
Cao et al.

(10) Patent No.: US 10,129,811 B2
(45) Date of Patent: Nov. 13, 2018

(54) MULTI-RAT HETEROGENOUS CARRIER AGGREGATION

(71) Applicant: Parallel Wireless, Inc., Nashua, NH (US)

(72) Inventors: Yang Cao, Westford, MA (US); Sumit Garg, Hudson, NH (US)

(73) Assignee: Parallel Wireless, Inc., Nashua, NH (US)

( * ) Notice: Subject to any disclaimer, the term of this patent is extended or adjusted under 35 U.S.C. 154(b) by 22 days.

(21) Appl. No.: 15/002,383

(22) Filed: Jan. 20, 2016

(65) Prior Publication Data

US 2016/0212755 A1 Jul. 21, 2016

Related U.S. Application Data

(60) Provisional application No. 62/105,333, filed on Jan. 20, 2015.

(51) Int. Cl.
| | |
|---|---|
| *H04W 40/12* | (2009.01) |
| *H04W 28/24* | (2009.01) |
| *H04W 84/18* | (2009.01) |
| *H04W 88/10* | (2009.01) |

(52) U.S. Cl.
CPC ............ *H04W 40/12* (2013.01); *H04W 28/24* (2013.01); *H04W 84/18* (2013.01); *H04W 88/10* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/22* (2018.01); *Y02D 70/34* (2018.01)

(58) Field of Classification Search
None
See application file for complete search history.

(56) References Cited

U.S. PATENT DOCUMENTS 9,755,798 B2    9/2017  Centonza et al.
2006/0248191 A1*  11/2006  Hudson ............... H04L 29/12
                                                                 709/226

(Continued)

OTHER PUBLICATIONS

Kevin Fitchard, "Can Millimeter Waves Solve the Small Cell Backhaul Problem?," Gigaom, (Apr. 11, 2012, 1:14PM), http://gigaom.com/2012/04/11/can-millimeter-waves-solve-the-small-cell-backhaul-problem/.

(Continued)

*Primary Examiner* — Anh Ngoc M Nguyen
(74) *Attorney, Agent, or Firm* — Michael Y. Saji; Keyur Parikh (57) ABSTRACT

A network node for facilitating data transfer is disclosed, comprising: a routing module configured to receive network link capacity information; a first radio interference operating on a first radio access technology and coupled to the routing module; and a second radio interface operating on a second radio access technology and coupled to the routing module, wherein the routing module is configured to receive packets directed to a third virtual radio interface and route the packets to one or both of the first and the second radio interfaces to provide throughput at the third virtual radio interface that is greater than throughput available via either the first or the second radio interfaces independently.

9 Claims, 7 Drawing Sheets

(56) References Cited

U.S. PATENT DOCUMENTS

| | | | |
|---|---|---|---|
| 2007/0041464 A1* | 2/2007 | Kim | H04L 1/0026 375/267 |
| 2011/0255486 A1 | 10/2011 | Luo et al. | |
| 2011/0319084 A1 | 12/2011 | Meshkati et al. | |
| 2012/0021753 A1 | 1/2012 | Damnjanovic et al. | |
| 2013/0088983 A1 | 4/2013 | Pragada et al. | |
| 2013/0114451 A1 | 5/2013 | Al-Dhahir et al. | |
| 2013/0142138 A1 | 6/2013 | Dinan | |
| 2013/0148620 A1 | 6/2013 | Nanri et al. | |
| 2014/0254565 A1* | 9/2014 | Pitchaiah | H04L 5/22 370/336 |
| 2015/0295633 A1* | 10/2015 | Annavajjala | H04B 7/0857 375/347 |
| 2015/0296490 A1 | 10/2015 | Yi et al. | |
| 2016/0050156 A1* | 2/2016 | Bergeron | H04L 47/41 370/235 |
| 2016/0119071 A1 | 4/2016 | Sagong et al. | |
| 2016/0143084 A1 | 5/2016 | Liao et al. | |
| 2016/0173152 A1 | 6/2016 | Rahman et al. | |
| 2016/0205580 A1 | 7/2016 | Pragada et al. | |
| 2016/0286425 A1 | 9/2016 | Gormley et al. | |

OTHER PUBLICATIONS

"Quality of Service (Qos) in LTE," 3GPP Long Term Evolution (LTE), http://4g-lte-world.blogspot.com/2013/01/quality-of-service-qos-in-lte.html.
"Airspan Demonstrates SDN Based Small Cell Backhaul Aggregation Technology," Airspan Networks, Feb. 26, 2014, http://www.airspan.com/2014/02/26/airspan-demonstrates-sdn-based-small-cell-backhaul-aggregation-technology/.
Anand Lal Shimpi & Joshua Ho, "Samsung Galaxy S 5 Review," AnandTech, (Apr. 8, 2014, 12:00AM), http://www.anandtech.com/show/7903/samsung-galaxy-s-5-review/8.
3rd Generation Partnership Project, 3GPP TR 36.808 v10.0.0 (Jun. 2012), "3rd Generation Partnership Project; Technical Specification Group Radio Access Network; Evolved Universal Terrestrial Radio Access (E-UTRA); Carrier Aggregation; Base Station (BS) Radio Transmission and Reception (Release 10)," 3rd Generation Partnership Project, Jun. 2012, V10.0.0.
3rd Generation Partnership Project, 3GPP TR 36.815 v9.1.0 (Jun. 2010), "3rd Generation Partnership Project; Technical Specification Group Radio Access Network; Further Advancements for E-UTRA; LTE-Advanced Feasibility Studies in RAN WG4 (Release 9)," 3rd Generation Partnership Project, Jun. 2010, V9.1.0.
3rd Generation Partnership Project, 3GPP TR 36.823 v11.0.1 (Sep. 2013), "3rd Generation Partnership Project; Technical Specification Group Radio Access Network; Evolved Universal Terrestrial Radio Access (E-UTRA); Carrier Aggregation Enhancements; User Equipment (UE) and Base Station (BS) Radio Transmission and Reception (Release 11)," 3rd Generation Partnership Project, Sep. 2013, V11.0.1.
3rd Generation Partnership Project, 3GPP TR 36.912 v10.0.0 (Apr. 2011), "LTE; Feasibility Study for Further Advancements for E-UTRA (LTE-Advanced) (3GPP TR 36.912 Version 10.0.0 Release 10)," 3rd Generation Partnership Project, Apr. 2011, V10.0.0.
3rd Generation Partnership Project, 3GPP TR 36.913 v8.0.0 (Jun. 2008), "3rd Generation Partnership Project; Technical Specification Group Radio Access Network; Requirements for Further Advancements for E-UTRA (LTE-Advanced) (Release 8)," 3rd Generation Partnership Project, Jun. 2008, V8.0.0.
European Telecommunications Standards Institute, ETSI TS 136 101 v12.6.0 (Apr. 2015), "LTE; Evolved Universal Terrestrial Radio Access (E-UTRA); and User Equipment (UE) Radio Transmission and Reception (3GPP TS 36.101 version 12.6.0 Release 12)," Apr. 2015, V12.6.0.
European Telecommunications Standards Institute, ETSI TS 136 211 v10.0.0 (Jan. 2011), "LTE; Evolved Universal Terrestrial Radio Access (E-UTRA); Physical Channels and Modulation (3GPP TS 36.211 version 10.0.0 Release 10)," Jan. 2011, V10.0.0.
European Telecommunications Standards Institute, ETSI TS 136 212 v12.2.0 (Oct. 2014), "LTE; Evolved Universal Terrestrial Radio Access (E-UTRA); Multiplexing and Channel Coding (3GPP TS 36.212 version 12.2.0 Release 12)," Oct. 2014, V12.2.0.
European Telecommunications Standards Institute, ETSI TS 136 213 v12.4.0 (Feb. 2015), "LTE; Evolved Universal Terrestrial Radio Access (E-UTRA); Physical Layer Procedures (3GPP TS 36.213 version 12.4.0 Release 12)," Dec. 2015, V12.4.0.
European Telecommunications Standards Institute, ETSI TS 136 300 v8.9.0 (Jul. 2009), "LTE; Evolved Universal Terrestrial Radio Access (E-UTRA) and Evolved Universal Terrestrial Radio Access Network (E-UTRAN); Overall Description; Stage 2 (3GPP TS 36.300 version 8.9.0 Release 8)," Jul. 2009, V8.9.0.
3rd Generation Partnership Project TSG RAN Meeting #66, "UE capability signaling for WLAN/3GPP radio interworking," 3rd Generation Partnership Project, RP-141979, Dec. 8-11, 2014, Maui, USA.
3rd Generation Partnership Project TSG RAN Meeting #66, "New SI Proposal: LTE-WLAN RAN Level Integration," 3rd Generation Partnership Project, RP-141813, Dec. 8-11, 2014, Maui, USA.
3rd Generation Partnership Project TSG RAN Meeting #66, "Why a Study on LTE-WLAN RAN Level Integration," 3rd Generation Partnership Project, RP-141814, Dec. 8-11, 2014, Maui, USA.
3rd Generation Partnership Project TSG RAN Meeting #66, "Motivation for New WI: Further Network-controlled WLAN/3GPP Radio Interworking," 3rd Generation Partnership Project, RP-141943, Dec. 8-11, 2014, Maui, USA.
3rd Generation Partnership Project TSG RAN Meeting #66, "New WI proposal: Further Network-controlled WLAN/3GPP Radio Interworking," 3rd Generation Partnership Project, RP-141944, Dec. 8-11, 2014, Maui, USA.
3rd Generation Partnership Project TSG RAN Meeting #66, "New SI proposal: LTE-WLAN Radio Level Integration," 3rd Generation Partnership Project, RP-141964, Dec. 8-11, 2014, Maui, USA.
3rd Generation Partnership Project TSG RAN Meeting #66, "Way forward for UE capabilities for WLAN/3GPP Radio Interworking," 3rd Generation Partnership Project, RP-142019, Dec. 8-11, 2014, Maui, USA.
Steve Hratko, "Getting Engaged: LTE and Wi-Fi Fall in Love," Ruckus Networks, an ARRIS Company, Apr. 2, 2015, retrieved from https://theruckusroom.ruckuswireless.com/wi-fi/2015/04/07/getting-engaged-lte-and-wi-fi-fall-in-love/.

* cited by examiner

MULTI-RAT HETEROGENOUS CARRIER AGGREGATION

CROSS-REFERENCE TO RELATED APPLICATIONS

This application claims the benefit of priority under 35 U.S.C. § 119(e) of U.S. Provisional Patent Application No. 62/105,333, filed on Jan. 20, 2015 and entitled "Multi-RAT Heterogeneous Carrier Aggregation," which is hereby incorporated by reference in its entirety for all purposes. The present application also hereby incorporates by reference for all purposes U.S. Pat. No. 8,879,416, "Heterogeneous Self-Organizing Network," filed Jan. 3, 2014; U.S. Pat. No. 8,867,418, "Methods of Incorporating an Ad Hoc Cellular Network into a Fixed Cellular Network," filed Feb. 18, 2014; U.S. patent application Ser. No. 14/453,365, "Systems and Methods for Providing LTE-Based Backhaul," filed Aug. 6, 2014; and U.S. patent application Ser. No. 14/777, 246, "Methods of Enabling Base Station Functionality in a User Equipment," filed Sep. 15, 2015.

BACKGROUND

Currently, base stations such as nodeBs and enhanced nodeBs (eNBs) require backhaul connections for transferring data to and from a core network or the public Internet. These backhaul connections are shared by all devices connected to the base station, and may be saturated as a result. Certain base stations may be equipped with multiple radio interfaces, such as a 4G Long Term Evolution (LTE)-protocol compatible radio and a Wi-Fi-compatible radio. It is desirable to use both the LTE and Wi-Fi radios together to provide improved bandwidth for the backhaul connection.

SUMMARY

In one embodiment, a network node for facilitating data transfer is disclosed, comprising: a routing module configured to receive network link capacity information; a first radio interference operating on a first radio access technology and coupled to the routing module; and a second radio interface operating on a second radio access technology and coupled to the routing module, wherein the routing module is configured to receive packets directed to a third virtual radio interface and route the packets to one or both of the first and the second radio interfaces to provide throughput at the third virtual radio interface that is greater than throughput available via either the first or the second radio interfaces independently.

The network node may be a mesh network node. The network node may be coupled to a second network node and the first and the second radio interfaces are coupled to a third and a fourth radio interface at the second network node. The network node may be a multi-radio access technology. The network node may have a routing module configured to provide a mapping from a user data context to one of the first radio interface and the second radio interface. The network node may have a routing module configured to receive network capacity information that reflects aggregate capacity over a network comprising a plurality of network nodes. The network node may have the traffic quality of service characteristics that are one of a Long Term Evolution (LTE) quality-of-service (QoS) class identifier (QCI) and Wi-Fi Wireless Multimedia Extensions (WME) access category (AC). The network node may have a routing module coupled to the third virtual network interface and to a higher-level network routing module.

In another embodiment, a method is disclosed for increasing backhaul network capacity in a mobile access network, comprising: receiving an access request from a mobile device; receiving a request for data from the mobile device; classifying the request for data according to a demanded throughput; identifying a plurality of network interfaces for serving the request for data based on the classification and based on channel characteristics of the plurality of network interfaces; and sending a request for the requested data over a virtual network interface that uses each of the plurality of identified network interfaces.

The method may contain a plurality of network interfaces that are radio interfaces and the virtual network interface is a virtual radio network interface. The method may further comprise: continuously monitoring the plurality of network interfaces to assess the channel characteristics of the plurality of network interfaces, and classifying a second request for data based on updated channel characteristics. The method may identify two of a plurality of radio interfaces for serving the request for data based on the classification and based on channel characteristics of the plurality of radio interfaces; and sending a request for the requested data over both of the identified two of the plurality of radio interfaces. The method may have the access request as a packet data protocol (PDP) context request in a Long Term Evolution (LTE) access network, and wherein the mobile device is a user equipment (UE). The method may have the demanded quality of service as one of the Long Term Evolution (LTE) quality-of-service (QoS) class identifier (QCI) and a Wi-Fi Wireless Multimedia Extensions (WME) access category (AC). The method may have a plurality of network interfaces including at least two of: Wi-Fi; Universal Mobile Telecommunications System (UMTS); Long Term Evolution (LTE); digital subscriber line (DSL); point-to-point protocol (PPP); land-mobile radio (LMR); television white space (TVWS); and Ethernet. The method may have the channel characteristics of at least one of: latency; jitter; received signal strength indication (RSSI); reference signal received power (RSRP); reference signal received quality (RSRQ); bit error rate; packet reception rate; and signal-to-noise ratio (SNR).

DETAILED DESCRIPTION

Multi-RAT aggregation can provide a method for providing increased bandwidth to mobile devices such as LTE-capable user equipments (UEs). By using more than one air interface at once, two devices may communicate with each other at a higher data rate with minimal interference. Methods for performing aggregation over multiple air interfaces are described. Radio interface and air interface are used interchangeably in this disclosure, as would be understood by one of skill in the art.

In the examples below, Wi-Fi (a/b/g/n/ac/ad/af, etc.) and LTE are described as exemplary air interfaces, but other radio access technologies may be used, including 3G, UMTS, television whitespace (TVWS), microwave, including line-of-sight (LoS) microwave, fiber optic, DSL, PPP, land-mobile radio (LMR), and satellite connections.

In some embodiments, multi-RAT aggregation may be enabled by operations performed at the transport layer or IP layer of the Open Systems Interconnection (OSI) model. A single connection can be split into multiple sub-connections and then separate radio interfaces may be assigned for each sub-connection. Connections may later be joined or re-split. Connections may be tagged using header information. In some embodiments, Hypertext Transport Protocol (HTTP) range request headers may be added to connections such that a single request is broken up into multiple non-overlapping byte ranges that together allow delivery of an entire file, thereby splitting a single connection or request in a manner transparent to higher layers. These range request headers may be interpreted to cause different range requests to be carried by different air interfaces.

In some embodiments, TCP flags or other headers may be added. Deep packet inspection may be used to identify headers within packets as they transit through various nodes, and may be used for identifying specific air interfaces to be used for transport. In some embodiments, specific air interfaces may be specified on a per sub-connection basis; in others, sub-connections may be automatically placed on different air interfaces without specification of specific interfaces to be used. In some embodiments, the capacity of each interface may be considered to provide an overall additive increase in capacity, potentially providing an integer multiple of throughput over that of a single channel.

In some embodiments,

Multipath transport control protocol (multipath TCP), defined in IETF RFC 6824, which is hereby incorporated in its entirety, is a well-known protocol for splitting a single connection into multiple sub-connections and delivering them via different routing paths. In some embodiments, aspects of multipath TCP may be used. For example, multipath TCP states that a node may detect that another node supports multipath TCP by detecting a plurality of IP addresses. In some embodiments of the present disclosure, one node may communicate to a second node that two radio interfaces are supported. The communication may be performed in a way similar to that used by multipath TCP. The first node may then initiate multi-RAT aggregation and may cause multiple sub-connections to be created or may request multiple sub-connections to be made at an upstream network node.

In some embodiments, HTTP range request carrier aggregation may be performed between mesh nodes. For example, a first mesh node may provide backhaul for a second mesh node. Certain backhaul requests may involve HTTP requests. The HTTP requests may be received from a user equipment. The HTTP requests may also be generated by the second mesh node. The HTTP requests may be broken up into multiple HTTP range requests, and the range requests may be spread over more than one radio access technology, such as LTE and Wi-Fi. In some embodiments, the range requests may be non-overlapping.

In some embodiments, non-HTTP data requests may be broken up into a plurality of range requests for data that include an identifier of a data object, a data start position, and a data end position. These requests may be non-HTTP range requests. Various protocols may be used in place of HTTP. Where protocols are used that do not support range requests, the generated range requests may be re-joined at an upstream network node before being sent to the originally-intended recipient. In some embodiments, communications between mesh nodes may be broken up into the plurality of range requests.

In some embodiments, requests for data may be split, or disaggregated, using means other than range requests. For example, sub-requests for data may be tagged or numbered, and the sub-requests may be sent separately via multiple radio access technologies. The words "disaggregated" and "aggregated" are used in this document to refer to requests for data that are broken up into multiple requests, and/or re-joined into a single request. Where HTTP and non-HTTP range requests are described, it is understood that other types of disaggregated and aggregated requests may be used.

In some embodiments, GRE tunnels, IPSec tunnels, bearers, LTE EPS bearers, user contexts, PDP contexts, or other tunnels may be requested and set up using aggregation such that they use a plurality of radio interfaces. Alternately or in combination, aggregated or disaggregated requests may be encapsulated and sent through the tunnels. In the case that multiple radio interfaces are used to deliver disaggregated requests, encapsulation may be performed at an upstream or downstream node after the requests are aggregated or reaggregated, in some embodiments. In other embodiments, a virtual tunnel may be created that spans more than one radio interface, allowing disaggregated results to be sent over more than one radio interface while still being encapsulated in the virtual tunnel.

Aggregation or disaggregation may be performed at different levels in the OSI network stack. For example, an HTTP request may be split into multiple range requests, thus providing disaggregation at the application layer. Alternately, a single HTTP response, with a data payload, may be delivered as a plurality of TCP data packets, which themselves may be disaggregated to provide disaggregation at the transport layer.

In some embodiments, a first and a second radio access technology are represented in an operating system network stack as network interfaces or network interface modules. A virtual network interface may be created that represents the use of both the first and the second radio access technology. The virtual network interface may be a software module that performs routing functions to direct traffic to the network interfaces of the underlying radio access technologies.

In some embodiments, the handset may use both Wi-Fi and LTE to send and/or receive data from the mobile base station used for access. In some embodiments, a plurality of HTTP range requests may be used to multiplex requests over a plurality of radio access technologies, such as Wi-Fi and LTE. Each mobile base station may then use both an LTE connection and a non-LTE connection, such as Wi-Fi or DSL, to send and receive data to and from one or more mesh nodes in the radio access network (which may be via LTE-A relay), until the requests reach a mesh node with high-bandwidth wired backhaul. The use of multiple radio access technologies may allow a greater aggregate bandwidth than either radio access technology in isolation, even with overhead.

In some embodiments, even though the handset only uses LTE to communicate with the access base station, the access base station may use one or more radio access technologies together to provide increased bandwidth. This may be advantageous when the access base station connection to the handset is higher-bandwidth than the backhaul connection, such as the depicted 1800 MHz LTE access connection versus the 900 MHz LTE backhaul.

In some embodiments, a UE may be connected to a base station, which may be connected to a core network including a serving gateway and a packet gateway. An EPS bearer may exist between the handset (optimized or non-optimized) and the serving gateway (SGW). Traffic from the handset may be disaggregated (at a packet level, or at an application layer level, or at another level) and carried over one or more radio access technologies. Before the EPS bearer is terminated at the SGW, an intermediate node may re-aggregate the disaggregated traffic so that the multi-RAT transport is transparent to the SGW. Similarly, download traffic from the SGW may be disaggregated and later re-aggregated at an intermediate node to transparently provide a single EPS bearer to the handset.

In some embodiments, the virtual network interface may represent itself to the network stack as having a maximum throughput higher than either of the first and the second radio access technology. For example, if a Wi-Fi interface with a theoretical 70 Mbps maximum throughput and an LTE interface with a theoretical 100 Mbps maximum throughput are present at a base station, a virtual interface combining both interfaces may report a maximum throughput of, for example, 170 Mbps. The throughput may be reported as less than the arithmetic addition of both sub-interfaces to account for overhead, in some embodiments.

In some embodiments, a routing layer may exist between the virtual network interface and the first and the second radio access technology. The routing layer may be conceptualized as an Open Systems Interconnection (OSI) Layer 1.5 layer. The routing layer may take into account the varying characteristics of the underlying technologies, including real-time radio signal quality or error rate characteristics, and may route data to one or the other based on this information. The data may be received at the virtual network interface in a packetized form, and then may be routed as a packet to one or the other of the underlying network interfaces.

In some embodiments, the packets received at the routing layer may be aggregated or disaggregated. A virtual radio interface may represent to the network stack that it has a medium access control protocol data unit maximum length (MAC PDU length), maximum transmission unit (MTU), or maximum segment size (MSS) that is larger than one or more of the underlying network interfaces. For example, a base station may have a Wi-Fi interface with an MTU of 7981 bytes, and an LTE interface with an MTU of 1428. The virtual interface may report an MTU of 7981 bytes, and may perform fragmentation at the routing layer to permit data to be sent over the LTE interface. As another example, two interfaces with MTUs of 1500 bytes may be combined to form a single interface with an MTU of 3000 bytes, and all packets may be fragmented to be sent over either interface.

In some embodiments, IP fragmentation may be supported. In some embodiments, IP fragmentation may include fragmentation of traffic using the S1, X2, Uu, Un, or other protocols.

Packets may be tagged using arbitrary parameters in the IP header to indicate that they belong to the virtual network interface. For example, a specific, configurable MTU or packet length may be used. In other embodiments, the standard IP headers for IP packet fragmentation, i.e., the "more fragments" and "fragment offset" flags, may be used.

Disaggregation may be performed according to known IP fragmentation techniques and methods, and may also take into account the arbitrary parameters described above. If it is known that the packets were received from an aggregating virtual interface, for example, the packets may be re-aggregated and delivered to a higher layer of a local networking stack from a corresponding virtual interface at the recipient node.

Aggregation or disaggregation may be performed at different points in a network, according to some embodiments. In some embodiments, the initial HTTP request may be disaggregated into a plurality of range requests at a first mesh node, and in other embodiments at a second mesh node. In some embodiments, downstream or upstream mesh nodes may further disaggregate the resultant disaggregated range requests.

Additionally, one or more buffers, frame sizes, MTU lengths, or other parameters related to network frame size may be increased to accommodate an increased size and/or throughput of the aggregated network interface, in some embodiments. This increase may be on the virtual network interface, at a higher layer in the networking stack, or within the routing layer, in some embodiments. For example, if a network interface buffer in the operating system or routing layer is designed to hold 1 second's worth of data, that buffer may be increased to hold 1 second's worth of data at the aggregate network interface's increased bandwidth.

In some embodiments, mesh network nodes may report their connection throughput to other mesh nodes as the aggregate capacity of their aggregated network interfaces. For example, a mesh node may report its combined Wi-Fi and LTE throughput as its total throughput to another mesh node for purposes of routing. In some embodiments, aggregate capacity of the network may be reported to a mesh node or to a controller based on aggregate throughput of the network's virtual interfaces.

In some embodiments, the UE may reaggregate requests. In some embodiments, downstream or upstream mesh nodes may also reaggregate requests. For example, if a single HTTP request is broken up at a first mesh node into two ranges and disaggregated into two HTTP range requests, and then sent over two radio interfaces to a second mesh node, the second mesh node having a high-bandwidth backhaul connection such as a fiber optic backhaul connection, the second mesh node may reaggregate the requests to form a single HTTP request and transmit the single request over the fiber optic backhaul connection, or the second mesh node may retransmit both HTTP range requests over the fiber optic backhaul connection.

In some embodiments, a gateway server in the data path between a UE and the public Internet, e.g., in the backhaul data path, may be used to aggregate or disaggregate requests. For example, a single request may be made by a UE, the single request may be disaggregated into separate requests by one or more mesh nodes, the mesh nodes may deliver all requests via a backhaul connection to the gateway server, and the gateway server may aggregate the separate requests before sending them on to the public Internet. The reverse may also be enabled by some embodiments, such that the gateway server may disaggregate a data payload, request, or response message, thereby allowing a mesh network to efficiently deliver the disaggregated data via one, two, or any appropriate number of radio interfaces, before being reaggregated by an egress mesh node or by a compatible user equipment, such as a device which may be capable of reaggregating HTTP range requests performed over Wi-Fi and LTE.

In some embodiments, coordination may be performed to determine which node will perform disaggregation or aggregation. The coordination may be between nodes directly, between nodes indirectly via messages that are received by nodes upstream or downstream, between a mesh node and a backhaul mesh node, and/or between nodes but further facilitated by a cloud coordination server. In some embodiments, multiple mesh nodes may perform disaggregation, independently or in coordination.

In some embodiments, radio interfaces may have differing reliability characteristics. The reliability characteristics of the underlying radio interfaces may be incorporated into the assignment of requests or sub-requests to a particular radio interface. In some embodiments, a request delivery failure over one radio interface may be detected and the request may be re-requested, either by the sender or the recipient node.

In some embodiments, when a request is split, or disaggregated, and the request is transmitted over a plurality of radio interfaces, either the sending or the receiving node may tag the received requests with the specific radio interface so that, upon receipt of the response, the responses may be retransmitted over the radio interfaces originally used.

In some embodiments, two or more mesh nodes may establish an 800 MHz radio frequency connection and may use the 800 MHz frequency connection as one of a plurality of radio access technologies or radio interfaces, in accordance with the above disclosure. 800 MHz is advantageous, particularly when used in conjunction with other radio interfaces, because it has the characteristic of being able to pass more effectively through buildings and walls.

In some embodiments, the above disclosure may be implemented in conjunction with multipath TCP. Multipath TCP enables a single data stream to be delivered via multiple paths, and is described more fully in IETF RFC 6824, which is hereby incorporated herein in its entirety. When combined with multipath TCP, in some embodiments, individual TCP subflows may be sent over different radio access technologies. In addition, new sub-flows may be initiated by an upstream node, a backhaul mesh node, a mesh node in the data path, or another node, in some embodiments. In addition, the sub-flows may be re-joined by the mesh egress node prior to transmission to the user device, in some embodiments.

Additionally, a device in the data path may serve as a multipath TCP proxy, in some embodiments. One or more mesh nodes, or a central cloud controller node, may advertise that it permits the use of multipath TCP, in some embodiments, and may act as a multipath TCP proxy node. When multipath TCP is utilized or requested by an upstream node, the multipath TCP proxy node may receive a plurality of multipath TCP streams and route the streams to one or more channels, EPS bearers, or TCP connections over one or more radio access technologies. The multipath TCP proxy node may operate in conjunction with a second multipath TCP proxy node, such that the first proxy separates individual TCP subflows and the second proxy re-joins the individual TCP subflows, thereby allowing multipath TCP to be provided or enabled by the network even when a client device or user equipment does not itself multipath TCP.

In some embodiments, a carrier aggregation mode may be initiated based on characteristics of a particular session, flow, tunnel, user, user device, mesh data path, or other characteristics. In some embodiments, the downstream node may be specifically requested to enter such a mode, in some embodiments by a cloud coordination server. In other embodiments, operation may be transparent to one or more nodes in the network and may be initiated at a mesh node based on a determination of radio interface capabilities at the next hop mesh node in the routing path.

The use of a plurality of different radio interfaces, such as Wi-Fi plus LTE, enables two or more transmissions to combine to provide the effective bandwidth of all interfaces added together. In addition, the heterogeneity among interfaces allows transmission and reception to be performed independently and without mutual interference among the interfaces. In some embodiments, routing is performed at one or more mesh nodes. In the mesh node performing routing, a routing table is enabled to include a cost parameter for each route. Individual radio access technologies may provide one, two, or more routes per RAT to each network or node in the routing table. A route may be identified as a carrier aggregation route using a tag or flag, in some embodiments. A cost parameter may be associated with each route. The cost parameter may be adjusted based on one or more factors, including: latency; link reliability; link availability; processing overhead for aggregation/disaggregation; and physical characteristics, like penetration power, of a particular frequency band; number of mesh network hops or other network hops to the final destination; or other factors. For example, in a network wherein two mesh nodes are connected via a variety of radio interfaces, and assuming the same latency for all connections, an 800 MHz radio interface may be assigned a higher cost parameter based on its greater reliability such that it should consequently be reserved for backup, an LTE interface may be assigned a lower cost parameter reflecting its high availability and high throughput, and a 2.4 GHz Wi-Fi radio interface may be assigned a neutral cost parameter given its balance of potential interference and high throughput.

In some embodiments, specific radio interfaces may be flagged in the routing table as permitting, or not permitting, carrier aggregation. In some embodiments, the capacity of each interface may be reflected in the routing table, allowing multiple interfaces to be aggregated to provide an overall additive increase in capacity, potentially providing an integer multiple of throughput over that of a single channel. In some embodiments, the routing table may be modified to provide virtual interfaces that are aggregations of more than one radio interface and that reflect the increased throughput provided by the individual radio interfaces. In some embodiments, an intra-layer routing module may be present within an aggregating virtual interface to provide routing of specific packets based on one or more of the cost parameters described above.

In some embodiments, quality of service parameters may be provided in relation to an individual network interface or the aggregated network interface in the routing table, the traffic quality of service parameters reflecting a Long Term Evolution (LTE) quality-of-service (QoS) class identifier (QCI) or a Wi-Fi Wireless Multimedia Extensions (WME) access category (AC), or other QoS parameters.

In some embodiments, the radio channel performance characteristics of the underlying radio interfaces may be continuously monitored to provide real-time updates to the routing table, thereby permitting the network to avoid channels that have transient interference, for example. These characteristics may include one or more of latency, jitter, received signal strength indication (RSSI), reference signal received power (RSRP), reference signal received quality (RSRQ), bit error rate, packet reception rate, or signal-tonoise ratio (SNR). In some embodiments, the aggregation and disaggregation may be managed to provide desired characteristics, the characteristics being one or more of the above characteristics. For example, if an LTE connection provides a lower latency than a Wi-Fi connection, a disaggregating base station may direct latency-sensitive requests and streams to the LTE connection.

In some embodiments, the description above may be applied to provide improved backhaul to an eNodeB connected via links in a mesh network to a fixed backhaul connection. For example, assume the eNodeB has at least a Wi-Fi link to one mesh node (the "egress node"), and an LTE link for providing access to one or more mobile devices. The egress node may have multiple Wi-Fi and LTE links to other mesh nodes, via which it may have access to the backhaul connection at the backhaul node. In some embodiments, the egress node may receive a request for data over HTTP and split it into multiple range requests. The multiple range requests may be retransmitted over both the Wi-Fi and LTE links to a single mesh node, or to two mesh nodes. The multiple range requests may be transmitted via the mesh network to the backhaul node, which may then reaggregate the requests and retransmit over the fixed backhaul connection.

In some embodiments, the description above may be applied to provide improved throughput to a UE supporting aggregation over Wi-Fi and LTE. For example, a UE may become aware that it is connected to both a Wi-Fi network and an LTE network, and may issue multiple requests for data. The multiple requests for data may be a plurality of HTTP range requests for a single data object. In the case that both the Wi-Fi and the LTE networks are provided by a single multi-RAT base station, the multi-RAT base station may identify that the multiple requests are for the same data object, and may reaggregate them into one request for the data object before retransmitting the one request. When the data object arrives from the Internet, the multi-RAT base station may deaggregate the response providing the data object into a plurality of responses corresponding to the originally-requested range requests, and may deliver the plurality of responses to the user over the originally-used radio interfaces.

In some embodiments, aggregation of an LTE radio interface may include aggregating a plurality of LTE channels, radio bearers, or carriers. For example, LTE carrier aggregation may be used to aggregate two adjacent LTE channels, and multi-RAT radio aggregation may be applied to the carrier-aggregated LTE radio interface to combine its bandwidth with the bandwidth of another radio interface. LTE carrier aggregation may be performed in accordance with 3GPP TR 36.808, TR 36.814, TR 36.815, TR 36.823, TR 36.912, TR 36.913, TS 36.101, TS 36.211, TS36.212, TS 36.213, and/or TS 36.300, which are hereby incorporated by reference. The aggregated carriers may be inter-band carriers, in some embodiments. A plurality of serving cells may be used in conjunction with carrier aggregation, in some embodiments, with multi-RAT carrier aggregation being performed at a primary serving cell (PSC), in some embodiments. In some embodiments, signaling information may be delivered on an aggregated LTE downlink channel for information about component carrier scheduling, and signaling information for HARQ ACK/NACK may be provided via both the uplink and downlink component carriers for each component carrier. LTE carrier aggregation operations such as component carrier scheduling and HARQ ACK/NACK may be performed within an LTE stack coupled to the routing layer above, in some embodiments, with the LTE stack being solely responsible for LTE component carrier coordination activities.

In some embodiments, a base station may include a processor, a plurality of radio interfaces, and a storage medium. The processor may execute instructions on the storage medium. The processor may retain, in its working memory, or on the storage medium, a routing table. The routing table may include routing cost parameters reflecting whether carrier aggregation may be performed on a particular radio interface. The base station may receive a request that is split over multiple radio interfaces, either from a user equipment or another base station. The base station may split or un-split (disaggregate or aggregate) a query, request, response, or message. The base station may be capable of providing multipath TCP capability.

In some embodiments, a mesh network may include a plurality of mesh network nodes. The mesh network nodes may each include processors, a plurality of radio interfaces, and storage media. The processors may execute instructions located at each mesh network node and may retain a routing table at each mesh network node, the routing table as described elsewhere herein. Each mesh network node may communicate with each other or with a central controller to indicate whether carrier aggregation may be initiated, terminated, or performed at the mesh network node. The mesh network nodes may receive a request that is split over multiple radio interfaces, either from a user equipment, a base station, or another mesh node, or a controller node. The mesh network nodes may split or un-split (disaggregate or aggregate) a query, request, response, or message. The mesh network nodes may be capable of providing multipath TCP capability. If the mesh network node has a fixed backhaul interface, it may disaggregate any requests before retransmitting a request for data over the fixed backhaul interface.

In some embodiments, a network controller may be placed in a data path between a mobile device and a core network. The network controller may receive a request that is split over multiple radio interfaces, either from a user equipment, a base station, a mesh node, or another network controller. The network controller may split or un-split (disaggregate or aggregate) a query, request, response, or message. The controller node may be capable of providing multipath TCP capability. The network controller may disaggregate any requests before retransmitting a request for data to the core network. The controller node may disaggregate or aggregate any requests or responses received from the core network before sending the requests or responses along to the next stop in the mesh network toward the intended destination.

In some embodiments, the network controller may receive coordination messages from one or more mesh nodes. The coordination messages may permit a mesh node to register whether or not it is capable of performing carrier aggregation as described herein, including specifically which radio interfaces it has and which other mesh nodes it is coupled to. The network controller may direct one or more mesh nodes to aggregate or disaggregate messages, responses, requests, or other communications between mesh nodes. The network controller may have direct or indirect read, write, and/or read/write access to routing tables stored at the mesh nodes, and may modify the routing tables to cause the mesh nodes to perform aggregation or disaggregation.

In some embodiments, more than two radio interfaces may be aggregated in accordance with the above disclosure. For example, three radio interfaces may be aggregated. As another example, a virtual network interface may be created to provide a single interface for three radio interfaces, an arbitrary number of radio interfaces, a heterogeneous combination of radio and non-radio interfaces, or a combination of network interfaces that may be re-combined and/or changed dynamically to include or exclude certain network interfaces.

In some embodiments, carrier aggregation may be used herein to mean multi-carrier bonding, and the technique used herein may be used to combine two interfaces or more than two interfaces into a single stream. In some embodiments, either Wi-Fi or LTE may be used as the primary connection and the other connection or connections as a secondary or slave connection.

Figure 1:
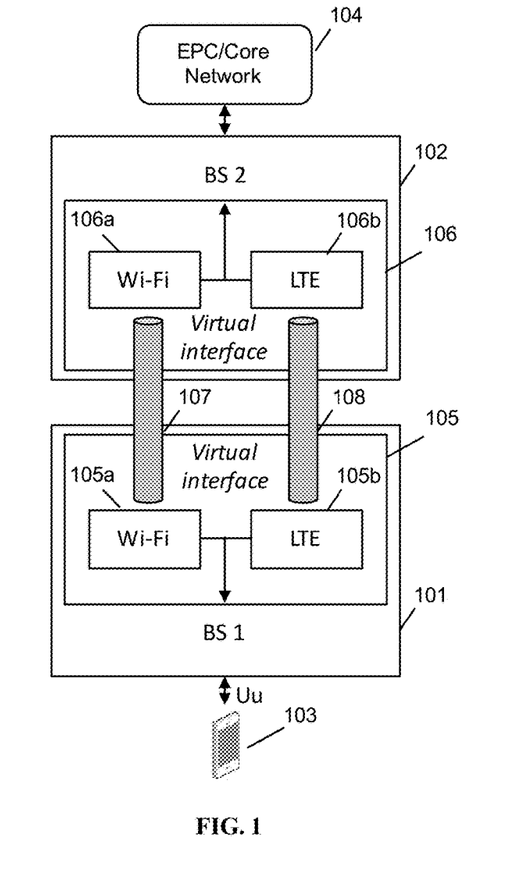
FIG. 1 is a schematic diagram of a pair of base stations, in accordance with some embodiments.

FIG. 1 is a schematic diagram of a pair of base stations, in accordance with some embodiments. FIG. 1 shows base station (BS) 1 101, coupled to BS 2 102. BS 1 and BS 2 may be eNodeBs, or may be enhanced eNodeBs as described elsewhere herein. BS 1 provides wireless access to UE 103. BS 1 uses BS 2 as backhaul, to transport traffic from UE 103 to the core network, shown as 104 and coupled to BS 2 102. BS 1 includes a virtual interface 105, which includes a Wi-Fi interface 105a and a Long Term Evolution (LTE) interface 105b. BS 2 includes a similar virtual interface 106 with Wi-Fi interface 106a and LTE interface 106b. Virtual interfaces 105 and 106 provide a single logical interface for use by higher levels of the networking stack on BS 1 and BS 2, respectively. Wi-Fi interfaces 105a and 106a can be connected wirelessly via Wi-Fi to provide connection 107, and LTE interfaces 105b and 106b can be connected wirelessly via LTE to provide connection 108.

The virtual interfaces aggregate and disaggregate transport control protocol (TCP) packets sent over the virtual interfaces, in some embodiments. For example, BS 1 may direct virtual interface 105 to transmit a sequences of packets. Some packets may be sent to BS 2 via Wi-Fi interface 105a, and some packets may be sent to BS 2 via LTE interface 105b. The disaggregation of the packets happens transparently to the higher levels of BS 1 and therefore to the UE 103 as well. Re-aggregation of the packets happens at virtual interface 106. Packets are received both by Wi-Fi interface 106a and by LTE interface 106b. The packets are rearranged, if necessary, and re-aggregated and sent to BS 2 at a higher layer. In the diagram, EPC/core network 104 is connected via another interface, which may be a wired or wireless interface; reaggregation happens prior to sending packets to EPC/core network 104.

In some embodiments, aggregation and disaggregation may be performed by a general purpose processor (GPP), or by a special-purpose processor, such as a network processor. In some embodiments, aggregation and disaggregation may occur via various algorithms. For example, a single TCP protocol request may be split into multiple requests, e.g., a single Hypertext Transport Protocol request may be split into two or more requests, or a single File Transfer Protocol request may be split into two or more requests, etc. Connection 107 and connection 108 may be equally balanced, or may be differently balanced, in some embodiments. For example, a Wi-Fi connection may provide 70 Mbps of bandwidth, and an LTE connection may provide 100 Mbps of bandwidth, and the virtual interface may disaggregate requests so as to balance usage of each link. In some embodiments, the total usable bandwidth could then reach or approach 170 Mbps. Various types of aggregation and disaggregation may be contemplated, including Layer 7 application layer request parsing, TCP packet sequence ID parsing, separation by UE identifier/IMSI/GUTI, or another method. In some embodiments, Wi-Fi access may be limited to UEs that authenticate via the LTE connection on the UE.

In some embodiments, virtual interfaces 105 and 106 may provide a logical interface to the operating system, which can be addressed by programs and services running on BS 1 and BS 2. The virtual interface may be a primary or default route for the BS. The virtual interface may be provided in addition to providing direct access to the underlying Wi-Fi and LTE interfaces. The BS may manage usage of each network link to ensure that link usage is not saturated. LTE and Wi-Fi security may be applied prior to transport at virtual interface 105, and may be removed at virtual interface 106 so as to permit recombining.

Figure 2:
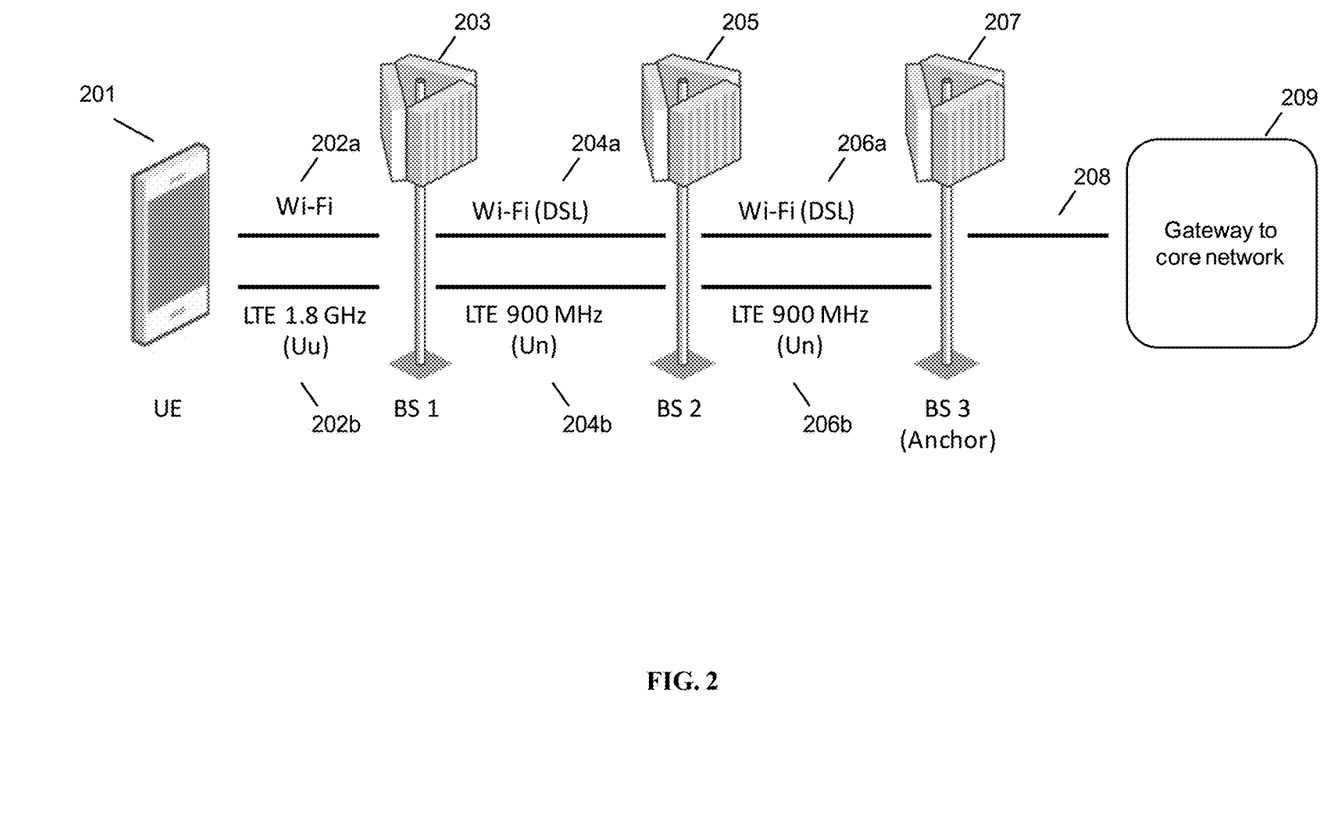
FIG. 2 is a network diagram of a dual-RAT UE connected to a mesh network, in accordance with some embodiments.

FIG. 2 is a network diagram of a dual-RAT UE connected to a mesh network, in accordance with some embodiments. UE 201 communicates via both Wi-Fi connection 202a and LTE connection 202b to BS 1 203. BS 1 203 is connected via a separate pair of connections 204a and 204b to BS 2 205 as a backhaul node. BS 2 205 is connected via a separate pair of connections 206a and 206b to BS 3 207. BS 3 207 is a base station that provides backhaul for BS 1 203 and BS 2 205 via backhaul connection 208, which is connected to a gateway to a core network 209. BS 3 may provide reaggregating capability for multiple-stream flows or packets received via connections 206a and 206b, for providing a single aggregated stream to the core network, and disaggregating capability to separate packets received from gateway 209 to properly utilize connection 206a and 206b.

Figure 5:
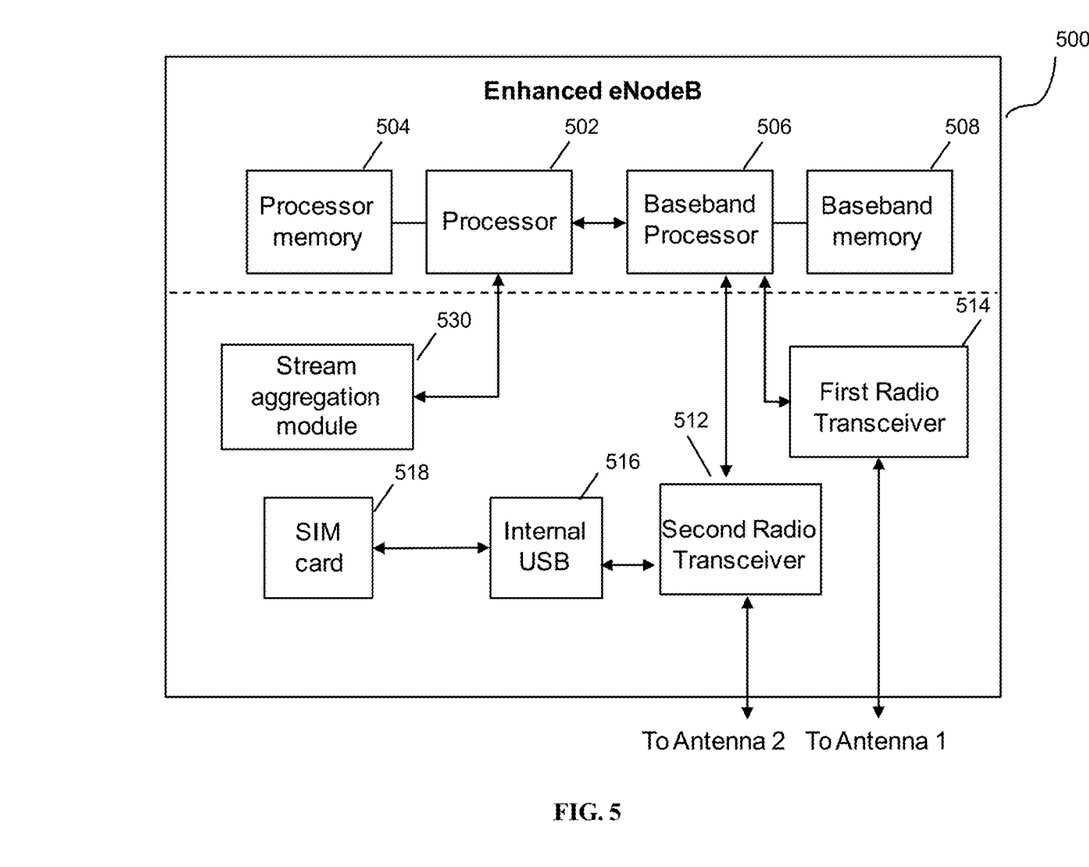
FIG. 5 is a schematic diagram of an enhanced eNodeB, in accordance with some embodiments.

BS 1 and BS 2 and BS 3 may be eNodeBs, or may be enhanced eNodeBs as described herein in FIGS. 1 and 5, and elsewhere herein, and may be arranged in a multipoint-to-multipoint mesh network. Gateway 209 may be an SGW, a PGW, or another node that is part of the core network, or may also be a proxy through which all traffic will pass on its way to the core network, as further described in FIGS. 6 and 7 herein. Wi-Fi connection 202a may use a Wi-Fi protocol supported by UE 201, including 802.11 a/b/g/n/ac or another Wi-Fi interface. Wi-Fi connection 202b may use an LTE Uu protocol connection. For example, this may be a 1.8 GHz connection, or another connection reserved for use by UEs in the particular region. Wi-Fi connections 204a and 206a may be mesh wireless connections, including 802.11 a/b/g/n/ac or another Wi-Fi connection, or a point-to-point connection provided over a Wi-Fi connection, or a wired digital subscriber loop (DSL) connection, or a microwave or non-line of sight (NLOS) connection, or another type of connection, such an LTE or 5G wireless connection. LTE connections 204b and 206b may use the LTE Un protocol and may operate on a frequency, such as the 900 MHz frequency shown here, reserved for use by operators and not for UEs, in some embodiments.

In some embodiments, UE 201 may provide its own disaggregating capability for managing wireless connections 202a and 202b. For example, the Samsung Galaxy™ S5 handset performs disaggregation of HTTP requests by using the HTTP range request feature of HTTP. This results in a single request being broken into multiple requests, where each file that is being received is covered by non-overlapping or overlapping ranges of bytes that are specifically requested in separate HTTP requests. These separate HTTP requests may be sent to BS 203 via different wireless connections, e.g., 202a and 202b. These separate HTTP requests may be sent without reaggregation all the way to the core network via gateway 209, in some embodiments. UE 201 may or may not represent connections 202a and 202b as a single virtual or logical interface. In some embodiments, however, as shown in FIG. 2, BS 3 207 may perform deep or shallow packet inspection and may detect that multiple HTTP requests are being made for the same file or object and may recombine into a single HTTP request, which may result in faster performance upstream from BS 3 207. In some embodiments, gateway 209 may perform this function instead of BS 3 207. This approach may be used for any UE that is capable of connecting with more than one RAT, with the UE having the ability to control or influence which requests are sent over which wireless connection. Various different approaches are possible, with different levels of control over utilization of the separate Wi-Fi and LTE interfaces being provided by using aggregation and disaggregation at different nodes. In some embodiments, connections 204a, 204b, and connections 206a, 206b can be aggregated into a single logical connection, as will be shown in the examples to follow.

Figure 3:
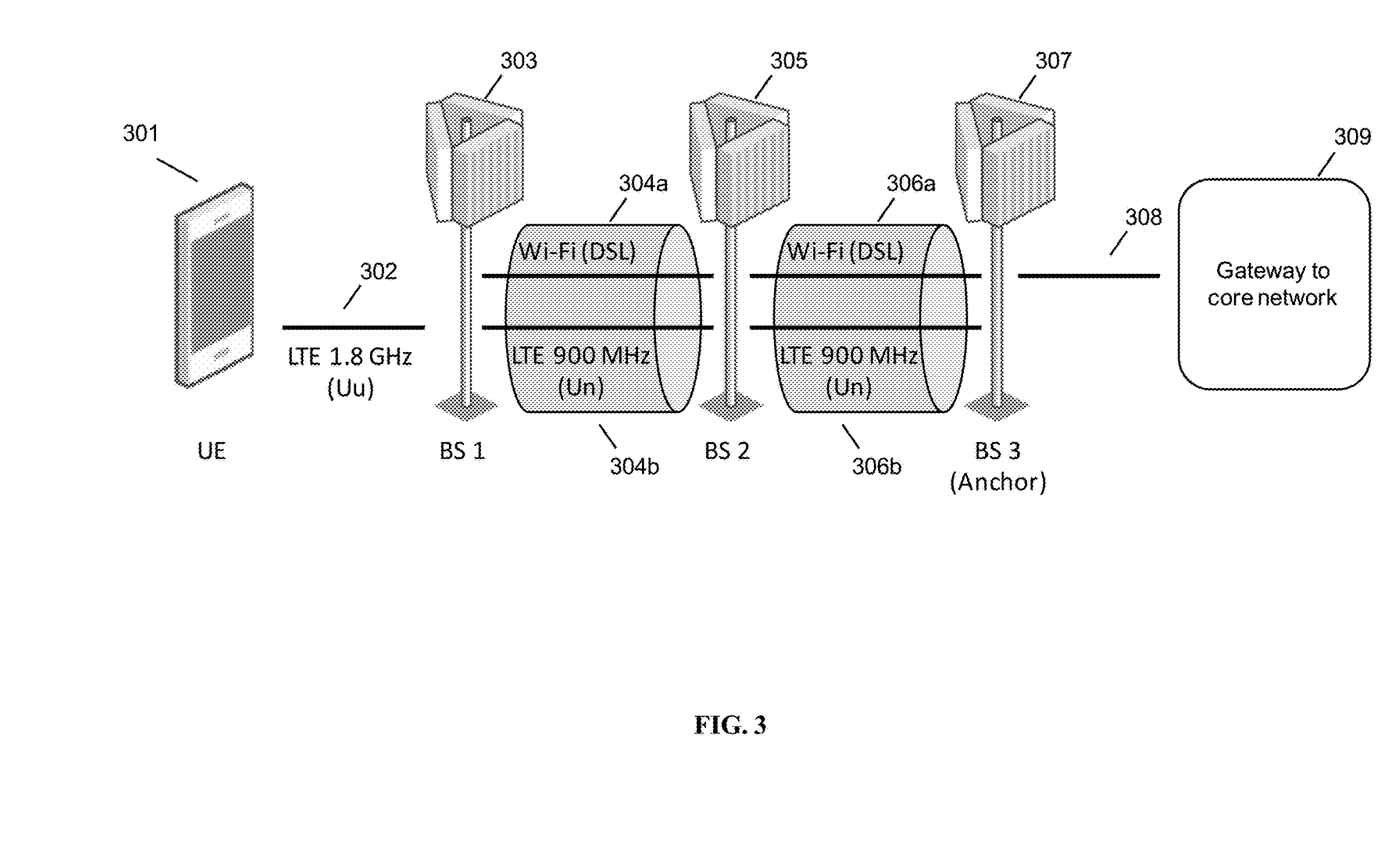
FIG. 3 is a network diagram of a UE connected to a mesh network, in accordance with some embodiments.

FIG. 3 is a network diagram of a UE connected to a mesh network, in accordance with some embodiments. UE 301 communicates via LTE connection 302 only to BS 1 303. BS 1 303 is connected via an aggregated pair of connections 304a and 304b, represented as a tunnel in the diagram, to BS 3 305 as a backhaul node. BS 3 305 is connected via an aggregated pair of connections 306a and 306b, represented as a tunnel in the diagram, to BS 3 307. BS 3 307 is a base station that provides backhaul for BS 1 303 and BS 3 305 via backhaul connection 308, which is connected to a gateway to a core network 309. BS 3 may provide reaggregating capability for multiple-stream flows or packets received via connections 306a and 306b, for providing a single aggregated stream to the core network, and disaggregating capability to separate packets received from gateway 309 to properly utilize connection 306a and 306b.

BS 1 and BS 3 and BS 3 may be eNodeBs, or may be enhanced eNodeBs as described herein in FIGS. 1 and 5, and elsewhere herein, and may be arranged in a multipoint-to-multipoint mesh network. Gateway 309 may be an SGW, a PGW, or another node that is part of the core network, or may also be a proxy through which all traffic will pass on its way to the core network, as further described in FIGS. 6 and 7 herein. UE 301 connects via Wi-Fi connection 302a may use a Wi-Fi protocol supported by UE 301, including 802.11 a/b/g/n/ac or another Wi-Fi interface. Wi-Fi connection 302b may use an LTE Uu protocol connection. For example, this may be a 1.8 GHz connection, or another connection reserved for use by UEs in the particular region. Wi-Fi connections 304a and 306a may be mesh wireless connections, including 802.11 a/b/g/n/ac or another Wi-Fi connection, or even a microwave or non-line of sight (NLOS) connection, or another type of connection, such an LTE or 5G wireless connection. LTE connections 304b and 306b may use the LTE Un protocol and may operate on a frequency, such as the 900 MHz frequency shown here, reserved for use by operators and not for UEs, in some embodiments.

Wi-Fi connections 304a and 306a may be mesh wireless connections, including 802.11 a/b/g/n/ac or another Wi-Fi connection, or a point-to-point connection provided over a Wi-Fi connection, or a wired digital subscriber loop (DSL) connection, or a microwave or non-line of sight (NLOS) connection, or another type of connection, such an LTE or 5G wireless connection. LTE connections 304b and 306b may use the LTE Un protocol and may operate on a frequency, such as the 900 MHz frequency shown here, reserved for use by operators and not for UEs, in some embodiments. However, unlike in FIG. 2, the underlying details of the Wi-Fi and LTE connections are abstracted by a virtual or logical interface at BS 1 and BS 2, such that higher protocol layers of BS 1 and BS 2 are aware of and are effectively using a single backhaul connection.

Management of utilization of the underlying interfaces may be performed at least at BS 1, which performs disaggregation of the data received from UE 301 via LTE connection 302, and at BS 3, which performs disaggregation of the data received from the core network. BS 1 performs aggregation of the data received via the logical interface and sends the re-aggregated data back over LTE connection 302. BS 3 performs aggregation of the data received via connections 306a and 306b and sends the re-aggregated data back over backhaul connection 308, which may be a wired or wireless backhaul connection of any type. In some embodiments, the aggregation function performed at BS 3 may be performed instead at gateway 309 before the data is forwarded to the core network.

Figure 4:
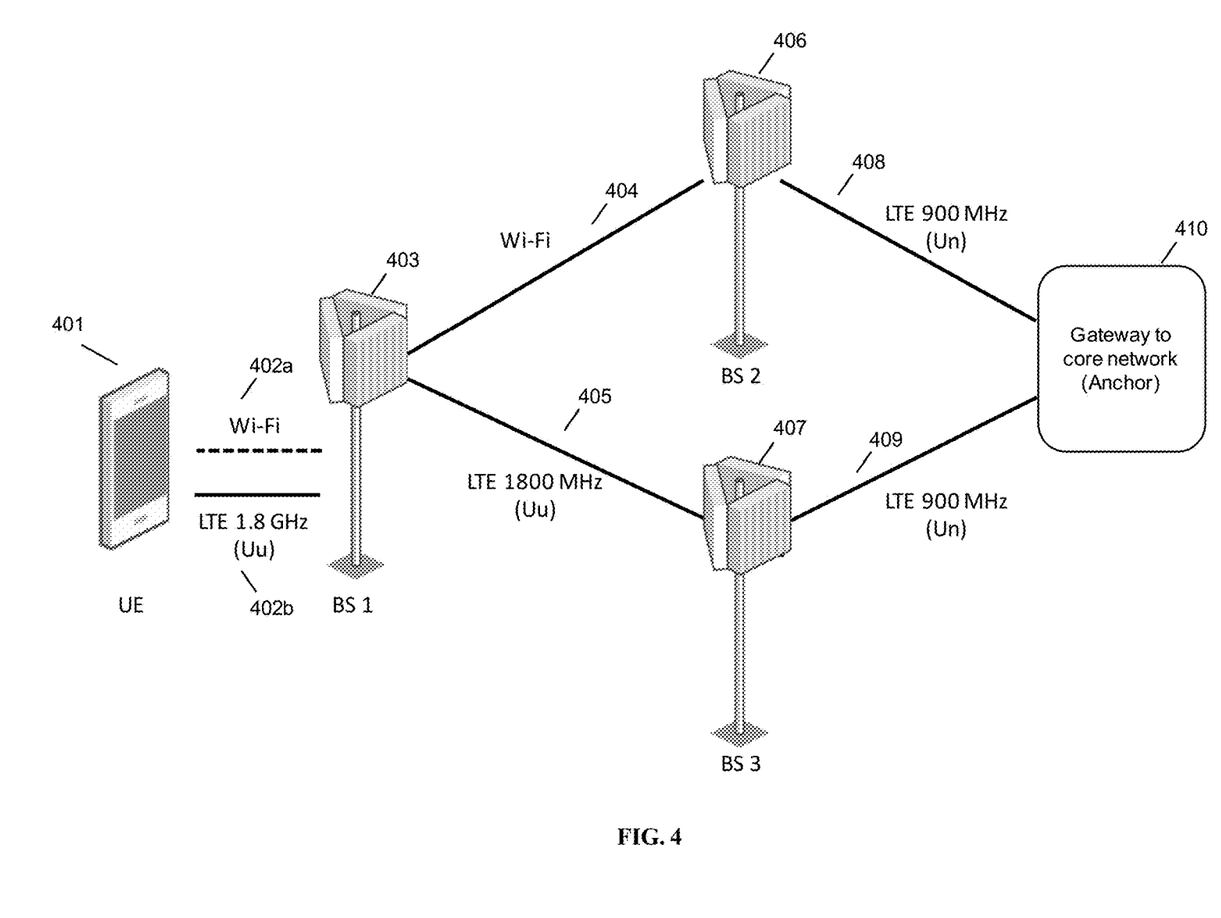
FIG. 4 is a second network diagram of a UE connected to a mesh network, in accordance with some embodiments.

FIG. 4 is a second network diagram of a UE connected to a mesh network, in accordance with some embodiments. UE 401 communicates via connection 402 to BS 1 403. Connection 402 may be an LTE Uu protocol connection only, or may be a combined LTE Uu and Wi-Fi connection, in some embodiments. BS 1 403 has a Wi-Fi interface and an LTE interface, and connects via Wi-Fi connection 404 to BS 2 406 and via LTE connection 405 to BS 3 407. BS 1 403 has an internal UE modem and connects to base station BS 3 407 via an LTE Uu connection, not via an LTE Un connection; wherever an LTE connection is described herein, it may be either a Uu connection using an internal UE modem or a Un connection, which may utilize the LTE Relay specification, in various embodiments. BS 2 406 has an LTE connection and uses LTE connection 408, which is a 900 Mhz Un connection, for backhaul to gateway to core network 410. BS 3 407 has an LTE connection and uses LTE connection 409, which is a 900 MHz Un connection, for backhaul to gateway to core network 410. Gateway 410 provides a gateway to the core network, and may perform aggregation and disaggregation as described elsewhere herein.

In FIG. 4, the UE 401 may be an LTE-only or multi-RAT UE. Communications to and from the UE may exceed the backhaul capacity of a single link, such as either of links 404 and 405, particularly if UE 401 is using both its RAT links to saturate BS 1. In this case, BS 1 may use multiple nodes in a mesh network to access additional backhaul capacity. This relies on BS 1 and, in some cases, BS 2 and BS 3, to be enabled to perform mesh routing. BS 1 may use the disaggregation technique described herein to separate the requests from UE 401 into a stream for Wi-Fi connection 404, and a stream for LTE connection 405. This enables the use of both connections 404 and 405 for egress from BS 1, and by operation of the mesh network shown, the use of both connections 408 and 409 to obtain greater backhaul capacity than either of single connections 408 and 409. Re-aggregation is performed at gateway 410. This technique may be used when multiple egress paths exist out of a mesh network, and increases the backhaul capacity of the mesh network for supporting traffic from a single UE.

FIG. 5 is a schematic diagram of an enhanced eNodeB, in accordance with some embodiments. Enhanced eNodeB 500 may include processor 502, processor memory 504 in communication with the processor, baseband processor 506, and baseband processor memory 508 in communication with the baseband processor. Enhanced eNodeB 500 may also include first radio transceiver 510 and second radio transceiver 512, internal universal serial bus (USB) port 516, and subscriber information module card (SIM card) 518 coupled to USB port 514. In some embodiments, the second radio transceiver 512 itself may be coupled to USB port 516, and communications from the baseband processor may be passed through USB port 516.

A signaling storm reduction module 530 may also be included, and may be in communication with a local evolved packet core (EPC) module 520, for authenticating users, storing and caching priority profile information, and performing other EPC-dependent functions when no backhaul link is available. Local EPC 520 may include local HSS 522, local MME 524, local SGW 526, and local PGW 528, as well as other modules. Local EPC 520 may incorporate these modules as software modules, processes, or containers. Local EPC 520 may alternatively incorporate these modules as a small number of monolithic software processes. SSR module 530 and local EPC 520 may each run on processor 502 or on another processor, or may be located within another device.

Processor 502 and baseband processor 506 are in communication with one another. Processor 502 may perform routing functions, and may determine if/when a switch in network configuration is needed. Baseband processor 506 may generate and receive radio signals for both radio transceivers 510 and 512, based on instructions from processor 502. In some embodiments, processors 502 and 506 may be on the same physical logic board. In other embodiments, they may be on separate logic boards.

The first radio transceiver 510 may be a radio transceiver capable of providing LTE eNodeB functionality, and may be capable of higher power and multi-channel OFDMA. The second radio transceiver 512 may be a radio transceiver capable of providing LTE UE functionality. Both transceivers 510 and 512 are capable of receiving and transmitting on one or more LTE bands. In some embodiments, either or both of transceivers 510 and 512 may be capable of providing both LTE eNodeB and LTE UE functionality. Transceiver 510 may be coupled to processor 502 via a Peripheral Component Interconnect-Express (PCI-E) bus, and/or via a daughtercard. As transceiver 512 is for providing LTE UE functionality, in effect emulating a user equipment, it may be connected via the same or different PCI-E bus, or by a USB bus, and may also be coupled to SIM card 518.

SIM card 518 may provide information required for authenticating the simulated UE to the evolved packet core (EPC). When no access to an operator EPC is available, local EPC 520 may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 500 is not an ordinary UE but instead is a special UE for providing backhaul to device 500.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 510 and 512, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access or backhaul, according to identified network conditions and needs, and may be under the control of processor 502 for reconfiguration.

Other elements and/or modules may also be included, such as a home eNodeB, a local gateway (LGW), a self-organizing network (SON) module, or another module.

Additional radio amplifiers, radio transceivers and/or wired network connections may also be included.

Processor 502 may identify the appropriate network configuration, and may perform routing of packets from one network interface to another accordingly. Processor 502 may use memory 504, in particular to store a routing table to be used for routing packets. Baseband processor 506 may perform operations to generate the radio frequency signals for transmission or retransmission by both transceivers 510 and 512. Baseband processor 506 may also perform operations to decode signals received by transceivers 510 and 512. Baseband processor 506 may use memory 508 to perform these tasks.

Figure 6:
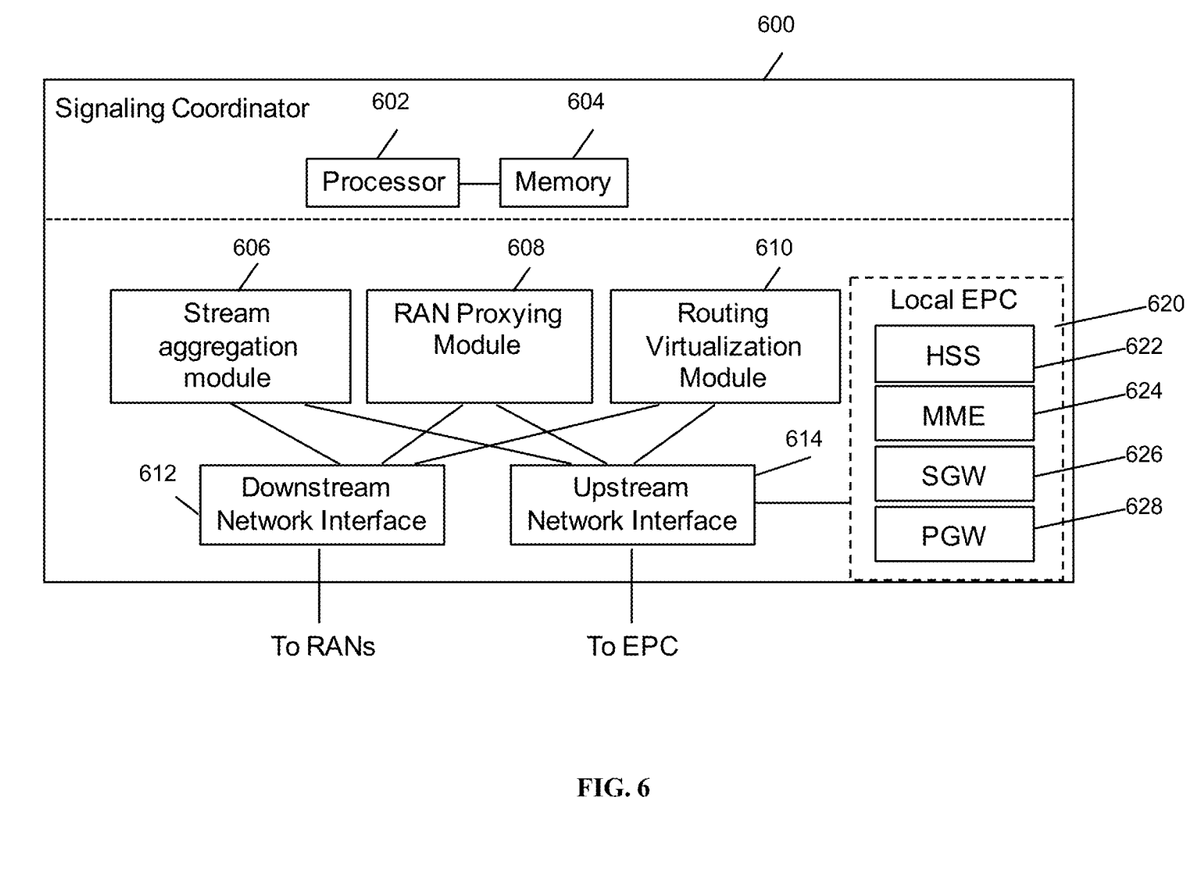
FIG. 6 is a schematic diagram of a signaling coordinator server, in accordance with some embodiments.

FIG. 6 is a schematic diagram of a signaling coordinator server, in accordance with some embodiments. Signaling coordinator 600 includes processor 602 and memory 604, which are configured to provide the functions described herein. Also present are radio access network coordination/signaling (RAN Coordination and signaling) module 606, RAN proxying module 608, and routing virtualization module 610. In some embodiments, coordinator server 600 may coordinate multiple RANs using coordination module 606. In some embodiments, coordination server may also provide proxying, routing virtualization and RAN virtualization, via modules 610 and 608. In some embodiments, a downstream network interface 612 is provided for interfacing with the RANs, which may be a radio interface (e.g., LTE), and an upstream network interface 614 is provided for interfacing with the core network, which may be either a radio interface (e.g., LTE) or a wired interface (e.g., Ethernet). Signaling storm reduction functions may be performed in module 606.

Signaling coordinator 600 includes local evolved packet core (EPC) module 620, for authenticating users, storing and caching priority profile information, and performing other EPC-dependent functions when no backhaul link is available. Local EPC 620 may include local HSS 622, local MME 624, local SGW 626, and local PGW 628, as well as other modules. Local EPC 620 may incorporate these modules as software modules, processes, or containers. Local EPC 620 may alternatively incorporate these modules as a small number of monolithic software processes. Modules 606, 608, 610 and local EPC 620 may each run on processor 602 or on another processor, or may be located within another device.

Figure 7:
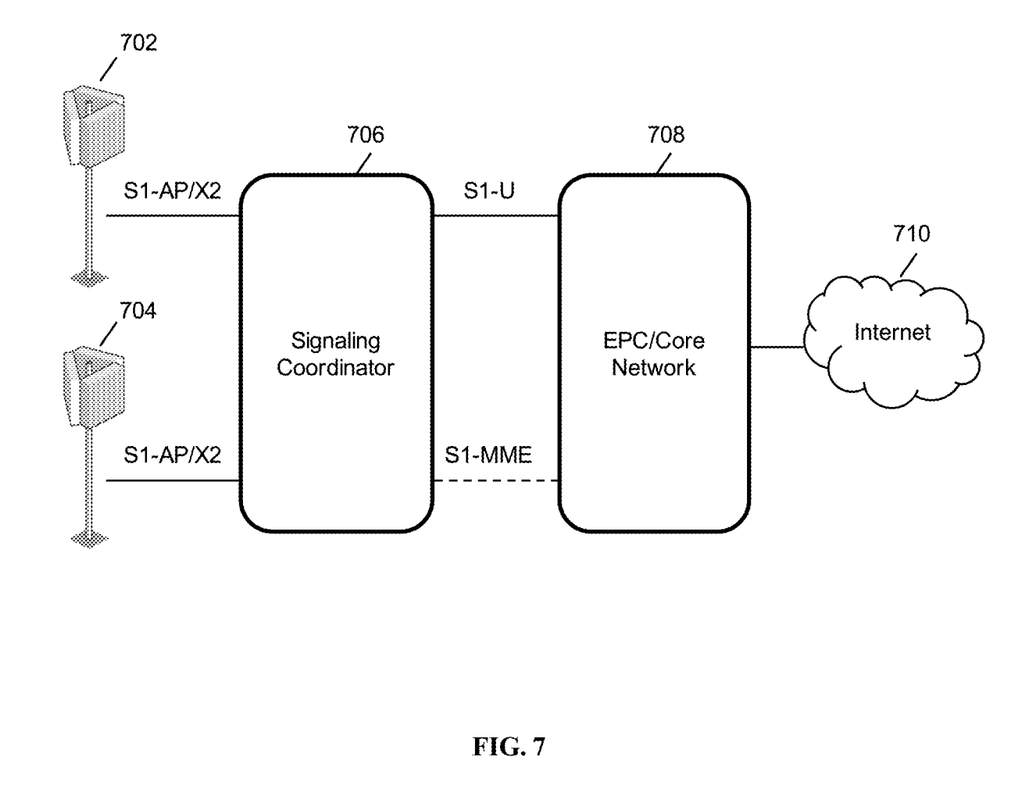
FIG. 7 is a system architecture diagram of an exemplary network configuration, in accordance with some embodiments.

FIG. 7 is a system architecture diagram of an exemplary network configuration, in accordance with some embodiments. Base stations 702 and 704 are connected via an S1-AP and an X2 interface to coordination server 706. Base stations 702 and 704 are eNodeBs, in some embodiments. Coordination server 706 is connected to the evolved packet core (EPC)/Core Network 708 via an S1 protocol connection and an S1-MME protocol connection. Coordination of base stations 702 and 704 may be performed at the coordination server. In some embodiments, the coordination server may be located within the EPC/Core Network 708. EPC/Core Network 708 provides various LTE core network functions, such as authentication, data routing, charging, and other functions. In some embodiments, mobility management is performed both by coordination server 706 and within the EPC/Core Network 708. EPC/Core Network 708 provides, typically through a PGW functionality, a connection to the public Internet 710.

In some embodiments, the radio transceivers described herein may be base stations compatible with a Long Term Evolution (LTE) radio transmission protocol or air interface, which may include LTE-A or any future 3GPP-based air interface and wireless protocol. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, legacy TDD, or other air interfaces used for mobile telephony. In some embodiments, the base stations described herein may support Wi-Fi air interfaces, which, whenever mentioned herein, may refer to IEEE 802.11a/b/g/n/ac/af/ah or another Wi-Fi protocol. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces. In some embodiments, the base stations described herein may use programmable frequency filters. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported. The embodiments disclosed herein can be used with a variety of protocols so long as there are contiguous frequency bands/channels. Although the method described assumes a single-in, single-output (SISO) system, the techniques described can also be extended to multiple-in, multiple-out (MIMO) systems. Wherever IMSI or IMEI are mentioned, other hardware, software, user or group identifiers, can be used in conjunction with the techniques described herein.

Those skilled in the art will recognize that multiple hardware and software configurations could be used depending upon the access protocol, backhaul protocol, duplexing scheme, or operating frequency band by adding or replacing daughtercards to the dynamic multi-RAT node. Presently, there are radio cards that can be used for the varying radio parameters. Accordingly, the multi-RAT nodes of the present invention could be designed to contain as many radio cards as desired given the radio parameters of heterogeneous mesh networks within which the multi-RAT node is likely to operate. Those of skill in the art will recognize that, to the extent an off-the shelf radio card is not available to accomplish transmission/reception in a particular radio parameter, a radio card capable of performing, e.g., in white space frequencies, would not be difficult to design.

Those of skill in the art will also recognize that hardware may embody software, software may be stored in hardware as firmware, and various modules and/or functions may be performed or provided either as hardware or software depending on the specific needs of a particular embodiment.

Although the scenarios for interference mitigation are described in relation to macro cells and micro cells, or for a pair of small cells or pair of macro cells, the same techniques could be used for reducing interference between any two cells, in which a set of cells is required to perform the CoMP methods described herein. The applicability of the above techniques to one-sided deployments makes them particularly suitable for heterogeneous networks, including heterogeneous mesh networks, in which all network nodes are not identically provisioned.

In any of the scenarios described herein, where processing may be performed at the cell, the processing may also be performed in coordination with a cloud coordination server. The eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. For example, certain methods involving the use of a virtual cell ID are understood to require UEs supporting 3GPP Release 11, whereas other methods and aspects do not require 3GPP Release 11.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A network node for facilitating data transfer, comprising:
    a routing layer configured to receive network link capacity information;
    a first radio interface operating on a first radio access technology and in communication with the routing layer; and
    a second radio interface operating on a second radio access technology and in communication with the routing layer,
    wherein the routing layer is between the first radio interface and a third virtual radio interface, and between the second radio interface and the third virtual radio interface, and
    wherein the routing layer is configured to receive packets directed to the third virtual radio interface and route the packets to one or both of the first and the second radio interfaces to provide throughput at the third virtual radio interface that is greater than throughput available via either the first or the second radio interfaces independently.

2. The network node of claim 1, wherein the network node is a mesh network node.

3. The network node of claim 1, wherein the network node is coupled to a second network node and the first and the second radio interfaces are coupled to a third and a fourth radio interface at the second network node.

4. The network node of claim 1, wherein the network node is a multi-radio access technology eNodeB.

5. The network node of claim 1, wherein the first radio interface is a Wi-Fi radio interface and wherein the second radio interface is a Long Term Evolution (LTE) radio interface.

6. The network node of claim 1, wherein the routing layer is configured to provide a mapping from a user data context to one of the first radio interface and the second radio interface.

7. The network node of claim 1, wherein the routing layer is configured to receive network capacity information that reflects aggregate capacity over a network comprising a plurality of network nodes.

8. The network node of claim 1, wherein the traffic quality of service characteristics are one of a Long Term Evolution (LTE) quality-of-service (QoS) class identifier (QCI) and a Wi-Fi Wireless Multimedia Extensions (WME) access category (AC).

9. The network node of claim 1, wherein the routing layer is coupled to the third virtual network interface and to a higher-level network routing module.

* * * * *